United States Patent [19]
Kellogg et al.

[11] Patent Number: 5,883,361
[45] Date of Patent: Mar. 16, 1999

[54] DIFFUSION BONDING FURNACE HAVING A NOVEL PRESS ARRANGEMENT

[75] Inventors: Charles Kellogg; Robert Wilson, both of Warrington, Pa.; Wayne Mitten, Mesa, Ariz.

[73] Assignee: Ipsen International, Inc., Cherry Valley, Ill.

[21] Appl. No.: 563,999

[22] Filed: Nov. 29, 1995

[51] Int. Cl.⁶ ..................................................... F27B 5/14
[52] U.S. Cl. ........................ 219/390; 100/326; 156/583.1
[58] Field of Search ..................... 100/264, 316, 100/317, 318, 326; 156/583.1; 219/390

[56] References Cited

U.S. PATENT DOCUMENTS

| | | |
|---|---|---|
| 3,155,758 | 11/1964 | Hill . |
| 3,263,015 | 7/1966 | Hill . |
| 3,420,985 | 1/1969 | Andersen et al. . |
| 3,461,709 | 8/1969 | McMillen . |
| 3,473,365 | 10/1969 | Schwartzbach . |
| 3,476,862 | 11/1969 | Cyrway, Jr. et al. . |
| 3,528,276 | 9/1970 | Schmidt et al. . |
| 3,632,954 | 1/1972 | Smith . |
| 3,764,718 | 10/1973 | Middough et al. . |
| 3,971,875 | 7/1976 | Regalbuto . |
| 4,087,037 | 5/1978 | Schier et al. . |
| 4,141,483 | 2/1979 | Untilov et al. . |
| 4,154,975 | 5/1979 | Sauder . |
| 4,288,021 | 9/1981 | Leodolter . |
| 4,429,403 | 1/1984 | Hooper . |
| 4,833,768 | 5/1989 | Ecklund et al. . |
| 4,901,552 | 2/1990 | Ginty et al. . |
| 4,963,221 | 10/1990 | Isobe et al. .............................. 156/358 |
| 4,984,732 | 1/1991 | Hudson et al. . |
| 5,063,662 | 11/1991 | Porter et al. . |
| 5,275,325 | 1/1994 | Stracquadaini . |
| 5,297,480 | 3/1994 | Miyashita et al. ........................ 100/90 |
| 5,555,798 | 9/1996 | Miyashita et al. ...................... 100/318 |
| 5,558,015 | 9/1996 | Miyashita et al. ........................ 100/50 |

Primary Examiner—Shawn Riley
Attorney, Agent, or Firm—Dann, Dorfman, Herrell and Skillman, P.C.

[57] ABSTRACT

A diffusion bonding furnace includes a pressure vessel having a top and a chamber. A press penetrates through an opening in the top of the pressure vessel, so that a first end of the press is disposed within the chamber. The opening in the top of the pressure vessel is sealed around the press to prevent leakage when the pressure vessel is at a pressure other than atmospheric pressure. A moveable bolster is secured to the first end of the press and a moveable platen is attached to the moveable bolster.

29 Claims, 10 Drawing Sheets

DIFFUSION BONDING FURNACE HAVING A NOVEL PRESS ARRANGEMENT

FIELD OF THE INVENTION

The present invention relates to a furnace for diffusion bonding of metallic components and, more particularly, to such a furnace having a novel press arrangement. The press has a unique combination of features which provide efficient and uniform heating of a workpiece and an effective seal which enables the use of an inert, reducing, or vacuum environment to be utilized in the furnace during the bonding process.

BACKGROUND OF THE INVENTION

In diffusion bonding or welding, the bonding occurs by operation of short-range interatomic forces. When the materials to be bonded are brought close together under proper conditions of pressure and temperature, a migration of the atoms at the interface between the materials occurs and a bond is formed.

In order to create a diffusion bond, the surfaces of the parts to be bonded must be clean of contaminants, such as oxygen, which hinder the formation of the bond. Thus, the bonding process is often carried out in an inert, a reducing, or a vacuum environment. The furnace environment is typically established using one of two methods. The first method utilizes a stationary, hard shell furnace which is sealed from the ambient atmosphere so that the furnace can be evacuated to a desired subatmospheric pressure. The furnace is filled with a suitable inert or reducing gas after evacuation. The second method involves encapsulating the parts to be bonded in a thin sheet metal container or retort. The retort is fabricated by fusion welding and is evacuated through a small tube welded to the retort.

Diffusion bonding is usually performed at a temperature equal to about one-half of the melting point of the material being bonded. The use of such an elevated temperature serves two functions. First, the rate of atomic transfer of contaminants away from the workpiece surface increases as the temperature increases. Second, an elevated temperature allows for moderate deformation of the faying surfaces to enhance contact therebetween. Heat is typically applied to the workpiece in stationary, hard shell furnaces by electrical resistance elements, although induction heating has also been employed. If the parts to be bonded are encapsulated in a retort, the entire assembly is heated, for example, by electrical resistance heaters surrounding the retort.

A number of techniques have been used to apply pressure or a load to the faying surfaces, thereby bringing the surfaces sufficiently close together to effectuate bonding. A load is often imposed on parts encapsulated in retorts by applying a positive gas pressure to the exterior of the evacuated retort. A load can also be applied to the workpiece by a hydraulic press with heated platens, by a rolling mill, or by a mechanical clamping device. When diffusion bonding is carried out in a stationary or hard shell furnace, pressure is applied to the workpiece by press platens contained within the chamber or by differential thermal constraint. The use of press platens is favored, however, since loading by differential thermal constraint requires the use of special jigs or fixtures made from materials that have a low coefficient of thermal expansion relative to the workpiece.

The previous methods for diffusion bonding suffer from disadvantages which make their use impractical under certain circumstances. The use of a retort suffers in that the retort is not reusable, the method is difficult to use on large workpieces, and there is a danger of explosion upon heating due to an increase in pressure of residual gases inside the retort. Likewise, the use of a stationary furnace has previously suffered from the inability to inexpensively maintain an adequate vacuum or inert environment and difficulty in effectively and uniformly heating the workpiece. Since those problems become more pronounced as the size of the furnace increases, the hot zones of the known stationary furnaces have been relatively small.

Accordingly, it would be highly desirable to have a diffusion bonding furnace that provides improved heating of the workpiece and an improved sealing mechanism to retain the inert, reducing, or vacuum environment in the furnace during operation. Additionally, the furnace should be capable of applying a high load to the workpiece, provide a relatively large hot zone, and be relatively easy and inexpensive to operate and maintain.

SUMMARY OF THE INVENTION

In accordance with the present invention, a furnace is provided with a high load capacity press mechanism having a high degree of linear placement control. The press mechanism is sealed to the furnace with an inexpensive sealing arrangement which allows for thermal expansion of the press without breaking the seal. Additionally, the heated parts of the furnace are provided with a thermal insulation arrangement that results in improved temperature uniformity of the heated workpieces, lower energy consumption, and shorter production times.

The diffusion bonding furnace of the present invention comprises a pressure vessel which has two side walls, a front wall, a back wall, a top, and a floor. The interior of the pressure vessel defines a hot zone for receiving the workpieces that are to be bonded. A press assembly for applying heat and pressure to the workpiece is mounted inside the pressure vessel. The press assembly includes a press which extends through the top of the pressure vessel into the hot zone. In accordance with one aspect of the present invention, a sealing arrangement is provided at the opening where the press penetrates the top of the pressure vessel in a manner that permits the press to slide into and out of the hot zone while maintaining an air-tight seal. The end of the press that extends into the hot zone includes a moveable platen/bolster assembly. The moveable platen/bolster assembly has a moveable bolster which is secured at the end of the press that extends into the hot zone. The moveable bolster is connected with a moveable platen. A similar platen/bolster assembly which is stationary is positioned directly below the moveable platen/bolster assembly. The stationary bolster is displaced from the floor of the pressure vessel by attaching the bolster to a bolster support base.

In accordance with another aspect of the present invention, the moveable and stationary platens of the press assembly include heating elements. The platens are each formed of two metallic plates which have channels running therebetween for substantially the entire length of the platen. The heating elements are disposed within these channels. The heating elements are electrically insulated from the platens by a plurality of heating element insulators. In accordance with a further aspect of this invention, the element insulators are formed to maximize heat transfer from the heating element to provide more efficient heating of the platens. In addition, the element insulators are shaped to limit the surface area of the insulators that is in contact with the plates of the platens so as to decrease the likelihood of short circuiting a heating element as the insulators become metallized.

The heating elements are powered by connecting the heating elements to a power supply through power terminals. In accordance with a further aspect of this invention, the connections between the power terminals and the heating elements comprise leaf-type spring connectors that are formed to flex so as to accommodate for expansion and contraction of the platens during heating and cooling, respectively.

The heating efficiency of a furnace in accordance with this invention is improved by thermally insulating the platen from the bolster in each platen/bolster assembly. This is accomplished by using a plurality of rigid insulating elements which are disposed between the platens and the bolsters. The insulating elements are formed from lengths of ceramic rod having hexagonal cross-sections and an axial bore.

BRIEF DESCRIPTION OF THE DRAWINGS

The foregoing summary, as well as the following detailed description of a preferred embodiment of the present invention, will be better understood when read in conjunction with the accompanying drawings, of which.

DETAILED DESCRIPTION OF THE INVENTION

Figure 1:
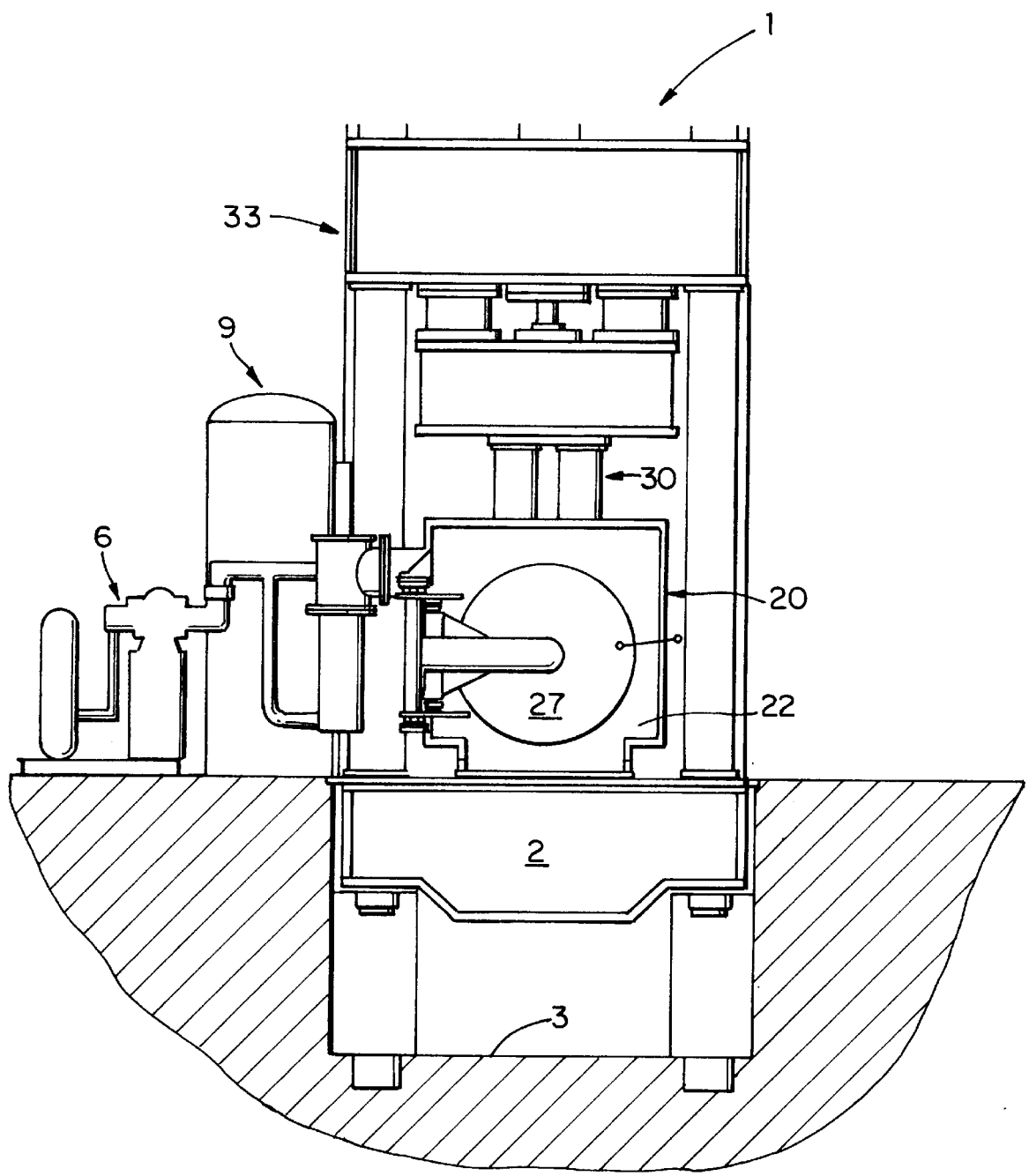
FIG. 1 is a front elevational view of a diffusion bonding furnace in accordance with the present invention.

Referring now to the drawings, and in particular to FIG. 1, there is shown a diffusion bonding furnace 1 in accordance with the present invention. The furnace 1 comprises a pressure vessel 20 mounted on a support structure 2 positioned in a concrete pit 3. A vacuum pumping system 6 is provided for evacuating gases from the pressure vessel 20.

A gas injection system 9 is provided for introducing an inert or reducing gas into the interior of the pressure vessel 20. In addition, the diffusion bonding furnace 1 has a press 30 for applying pressure to a workpiece within the pressure vessel 20. A drive mechanism 33 is provided for moving the press 30 into and out from the vessel 20.

Figure 2:
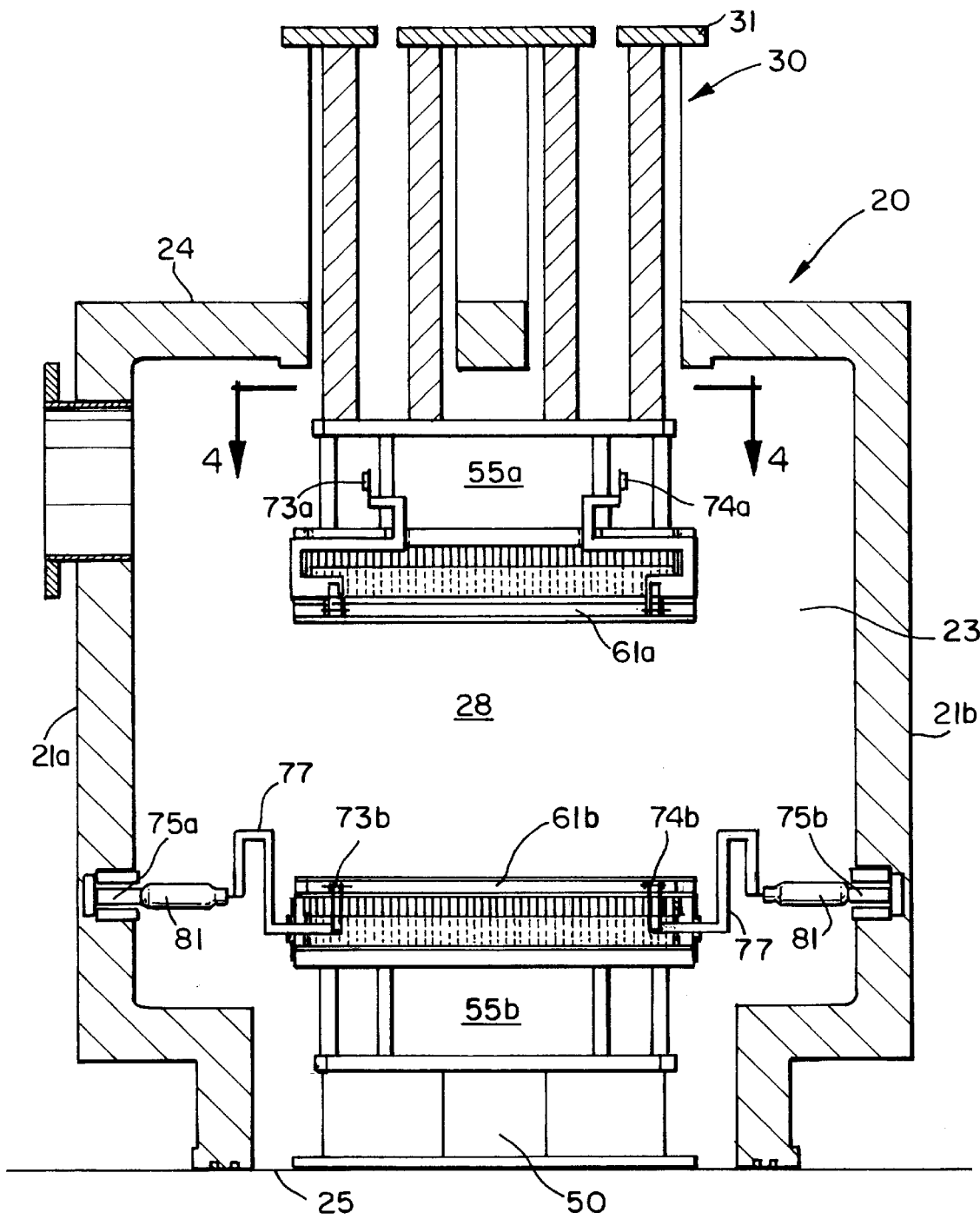
FIG. 2 is a front elevational view, in partial section, of the interior of the pressure vessel shown in FIG. 1.

The interior of pressure vessel 20 of the present invention is illustrated in FIG. 2. The vessel 20 has side walls 21a and 21b, a front wall 22, a back wall 23, a top 24, and a floor 25. Preferably, front wall 22 is provided with a door 27 (as best shown in FIG. 1). The interior of pressure vessel 20 defines a hot zone 28 within which the workpiece is heated. A radiation source, such as resistance or induction heating elements (not shown), are provided within the interior of pressure vessel 20 to effectuate the heating of the workpiece. Preferably, the vessel 20 is lined with thermal insulation (not shown) to reduce heat loss from the hot zone 28.

Press 30 penetrates through the top 24 of the vessel 20 into the hot zone 28. One end of the press 30 extends into the hot zone 28 and is secured to a moveable bolster 55a by bolting a retaining sleeve 47c to a ram lip 46b with bolts 48e and 48f. A moveable platen 61a is attached to the bolster 55a. The other end of the press 30 is attached to a top plate 31 by bolting a retaining sleeve 47a to a ram sleeve lip 45 with bolts 48a and 48b and bolting a retaining sleeve 47b to a ram lip 46a with bolts 48c and 48d. O-rings 32 are provided to effectuate a seal between the press 30 and the top plate 31. The top plate 31 is in turn attached to a hydraulic drive mechanism 33 which is operable to drive the press 30 into and out from the hot zone 28. Preferably, the press 30 is capable of producing at least about 20,000 psi of pressure on a workpiece in the furnace hot zone.

Figure 3:
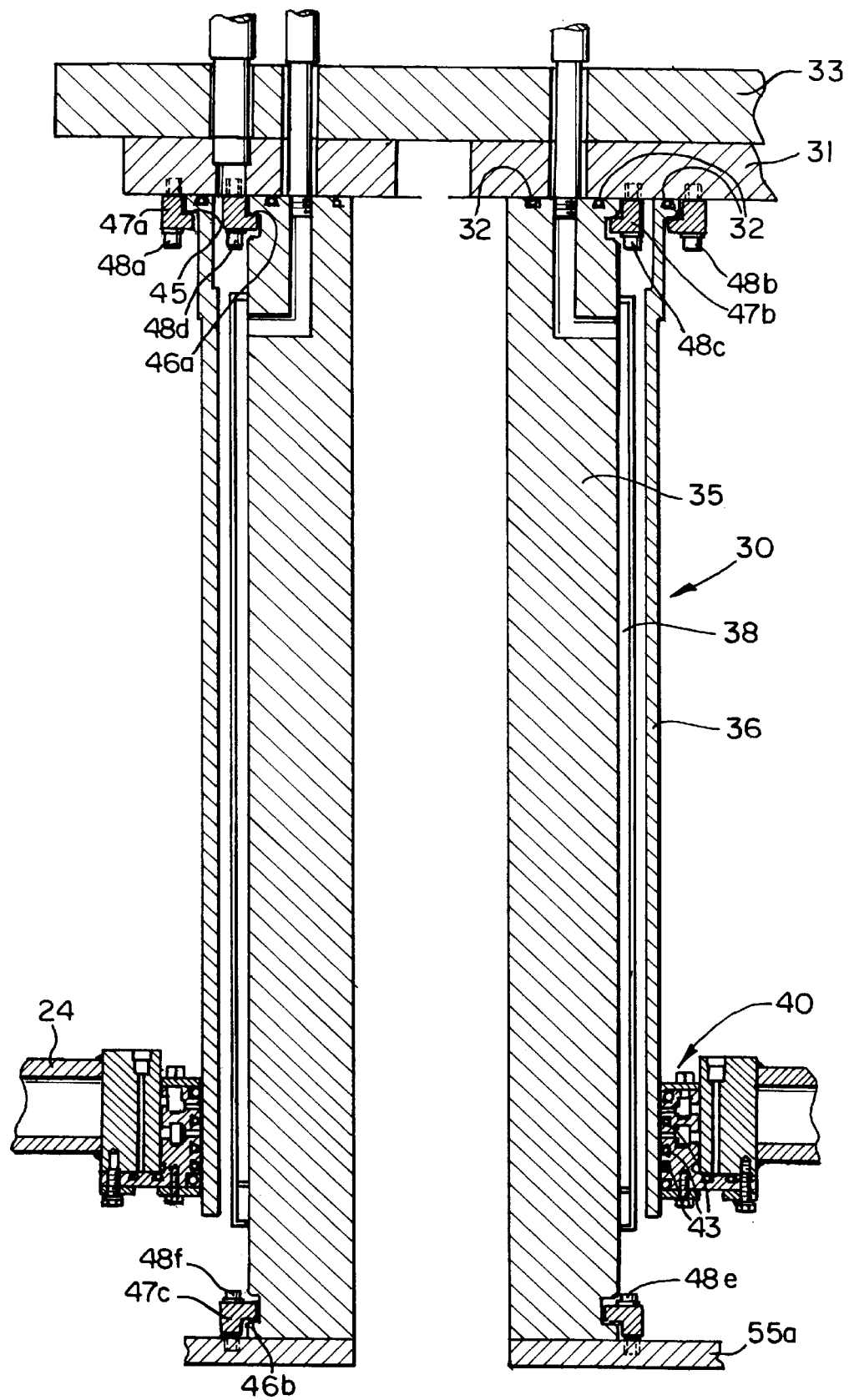
FIG. 3 is a side elevational view, in section, of a ram for the press used in the diffusion bonding furnace according to the present invention.

In the embodiment shown in FIG. 3, the press 30 includes a tubular ram 35 which extends concentrically through a tubular sleeve 36. Tubular sleeve 36 has one end affixed to top plate 31 adjacent to tubular ram 35. In that manner, sleeve 36 can move with ram 35 when press 30 is activated. Preferably, the ram 35 is cooled by flowing water through an annular water jacket 38 attached to ram 35 between the ram 35 and the tubular sleeve 36.

A sealing arrangement 40 is provided at the opening where the press 30 penetrates the top 24 of pressure vessel 20 to prevent leakage when the interior of the pressure vessel is at a pressure other than atmospheric pressure, e.g., under vacuum. A tight seal is made between the press 30 and the sealing arrangement 40 using O-rings 43 which abut against the press 30. In this manner, the press 30 can be extended into and retracted from the hot zone 28 without introducing a significant amount of ambient air into the hot zone 28. The tubular sleeve 36 allows ram 35 to have minor transverse movements when the press 30 is moved into or out of the pressure vessel 20, without the seal being breached. In this manner, the integrity of furnace atmosphere is better maintained.

Figure 4:
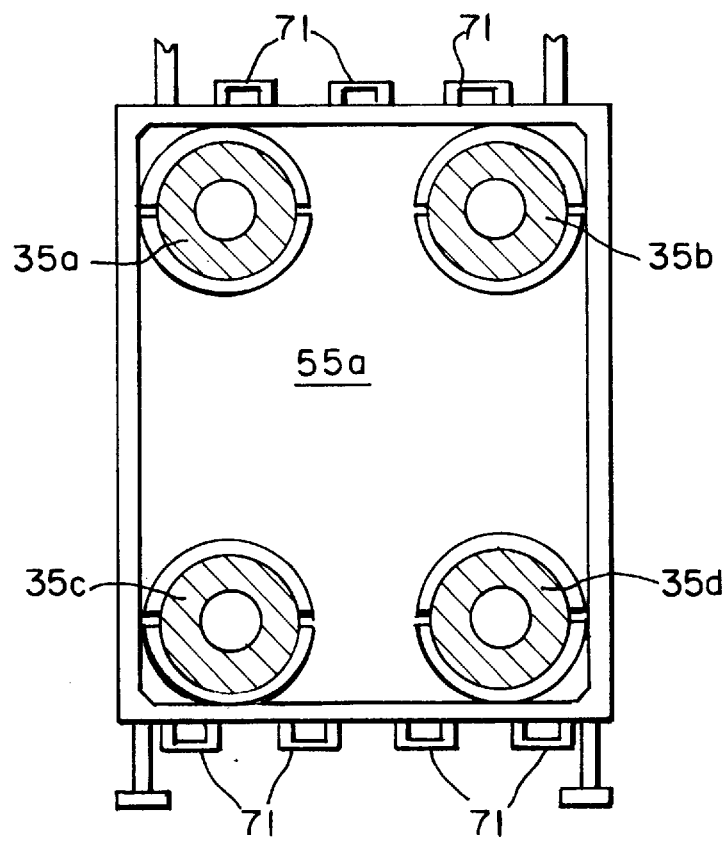
FIG. 4 is a sectional, top plan view of the pressure vessel shown in FIG. 2 as viewed along line 4—4.

In order to form a uniform diffusion bond, it is important to apply pressure evenly over substantially the entire surface of the workpiece. To accomplish this, more than one ram 35 is often used, especially for large workpieces. For example, as depicted in FIG. 4, an arrangement utilizing four rams 35a–d is illustrated. Each ram 35a–d extends into the hot zone 28 through a separate sealing arrangement 40. The ends of the rams 35a–d that extend into the hot zone 28 are each secured to a single bolster. The other ends of the rams 35a–d are each attached to a single top plate 31 and to the drive mechanism 33.

Referring back to FIG. 2, a stationary platen 61b and bolster 55b are mounted in the pressure vessel 20 and positioned directly below the moveable platen/bolster assembly. The stationary bolster 55b is positioned above the floor 25 of the pressure vessel 20 by attaching the stationary bolster 55b to a bolster support base 50.

Figure 5:
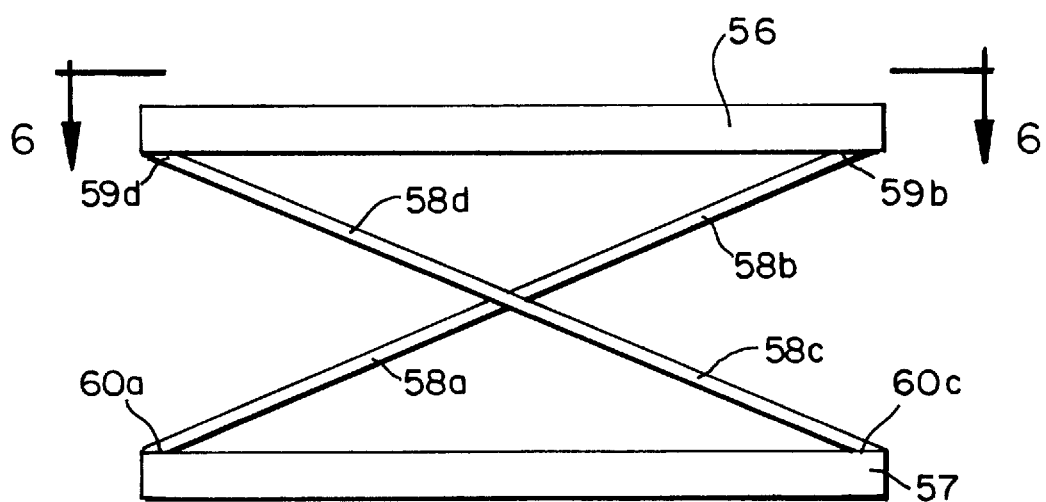
FIG. 5 is a side elevational view of a bolster used in the diffusion bonding furnace according to the present invention with one bolster plate removed.
Figure 6:
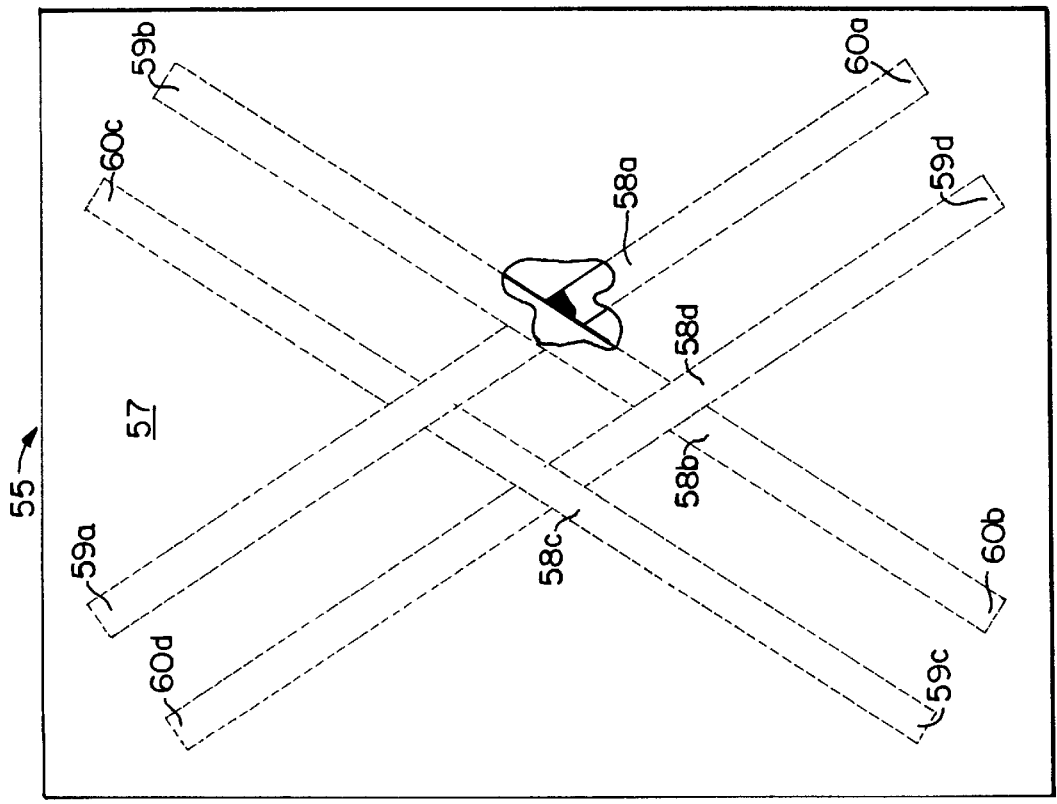
FIG. 6 is a top plan view of the bolster depicted in FIG. 5 as viewed along line 6—6.

Preferably both the moveable bolster 55a and the stationary bolster 55b are constructed as shown in FIGS. 5 and 6. The bolster 55a, which is typical, is designed to balance the loading stresses exerted thereon when pressure is applied to the workpiece. The bolster 55a includes a first bolster plate 56 and a second bolster plate 57. Four diagonally arranged cross braces 58a–d are used to connect the first bolster plate 56 to the second bolster plate 57. A first end 59a–d of each of the cross braces 58a–d is attached to first bolster plate 56 near each corner thereof. A second end 60a–d of each cross brace 58a–d is attached to the diagonally opposite corner of the second bolster plate 57, thereby forming two interlinked crosses between the first bolster plate 56 and the second bolster plate 57. Preferably, bolster 55a is formed of a stainless steel alloy.

Figure 8:
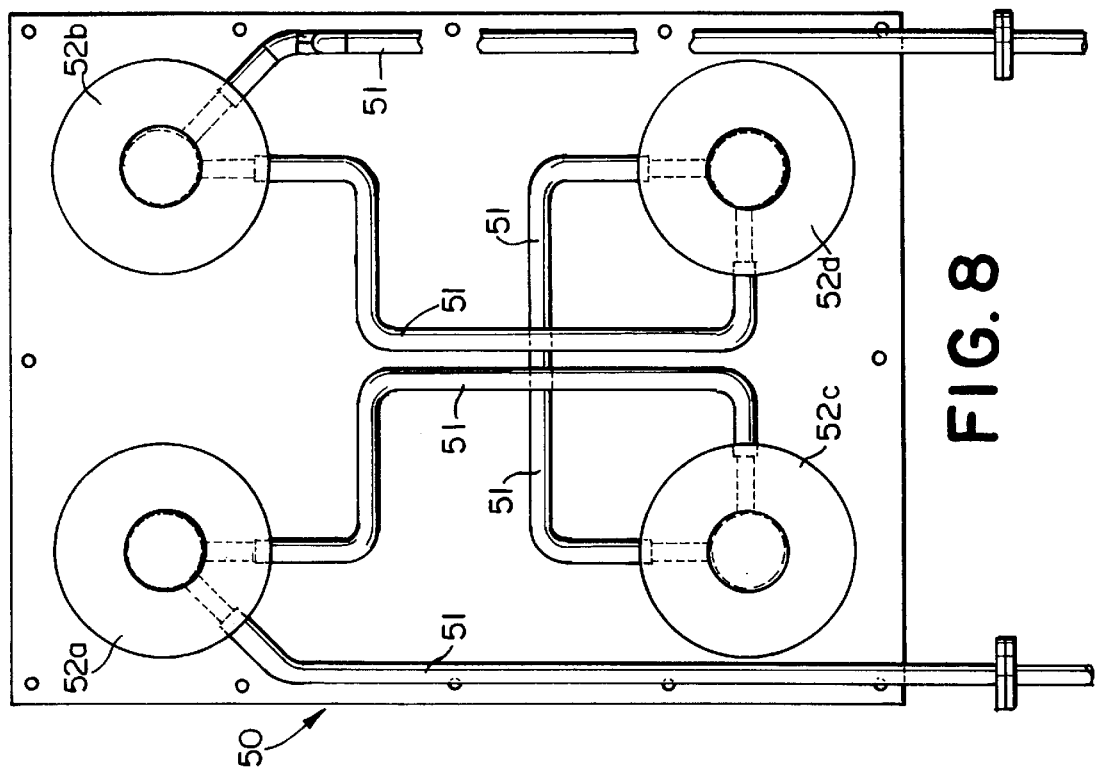
FIG. 8 is a top plan view of the bolster support base depicted in FIG. 7 as viewed along line 8—8.
Figure 7:
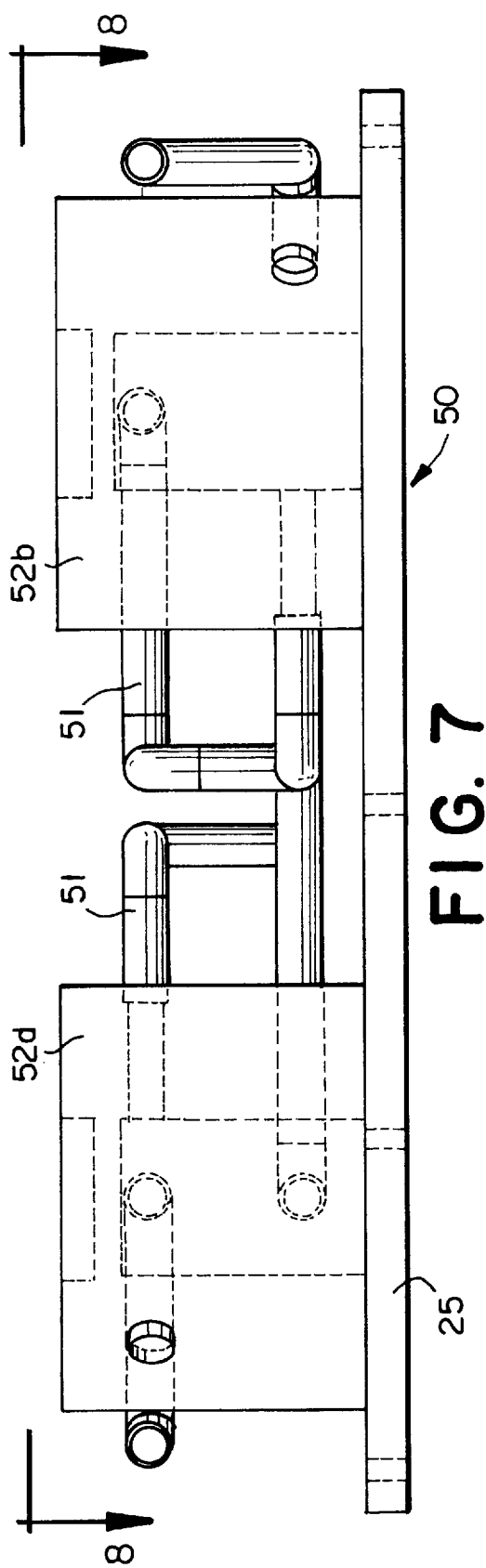
FIG. 7 is a side elevational view of a bolster support base.

The bolster support base 50 is designed to evenly distribute the pressure applied to the workpiece by providing pressure points that are aligned with corresponding pressure points of the press 30. In the embodiment depicted in FIG. 4, the press 30 includes four rams 35a–d that apply pressure to the moveable bolster 55a. To balance the pressure exerted on the workpiece by the press 30, the bolster support base 50 shown in FIGS. 7 and 8 includes four cylindrical columns 52a–d which have about the same diameter as the rams 35a–d. Each of the columns 52a–d are disposed in axial alignment with one of the rams 35a–d on the opposite side of the workpiece therefrom. The bolster support base 50 is preferably equipped with an arrangement of pipes 51 through which a coolant circulates into and through columns 52a–d.

Figure 10:
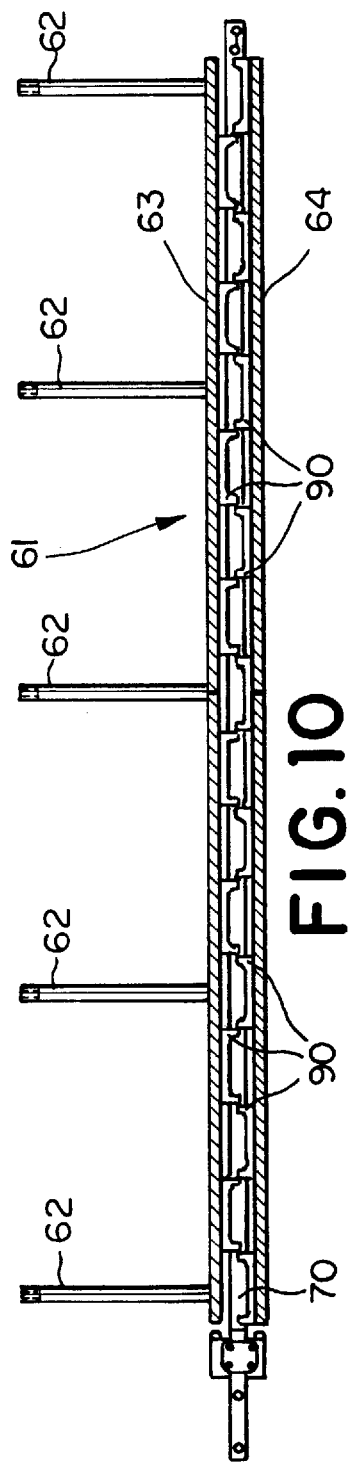
FIG. 10 is a side elevational view of the platen depicted in FIG. 9 as viewed along line 10—10.
Figure 9:
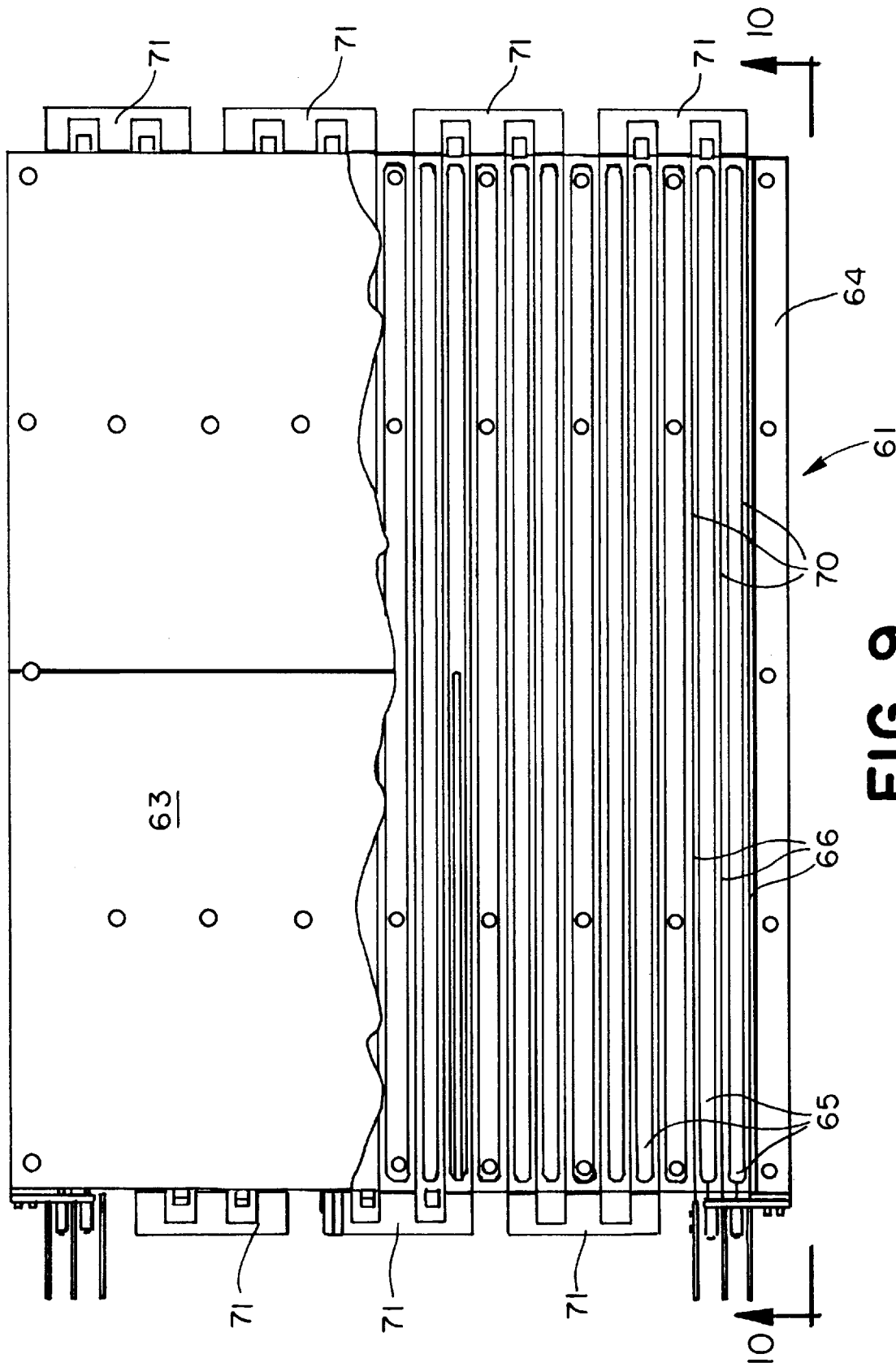
FIG. 9 is a top plan view of a platen used in accordance with the present invention with a portion of the top plate removed to reveal the interior structure.

Referring now to FIGS. 9 and 10, the moveable and stationary platens, 61a and 61b each comprise a first platen plate 63 and a second platen plate 64. Preferably, the first and second platen plates, 63 and 64, are made from TZM® molybdenum. The first and second platen plates, 63 and 64, are arranged substantially parallel to each other. A plurality of bars 65 are disposed between the platen plates 63 and 64 so as to create a plurality of parallel channels 66 which run the length of the platen. The bars 65 are preferably formed of TZM® molybdenum for heat resistance and are held in place by dowels (not shown). A plurality of resistive heating elements 70 are positioned in the channels 66. The heating elements 70 are typically made from tungsten. The individual heating elements 70 are interconnected by element connectors 71 so as to create a continuous electrical path. Preferably, the element connectors 71 are formed from molybdenum. As shown in FIG. 9, three separate electrical paths are utilized so that the power density requirement for each heating element 70 can be kept at a relatively low level, thereby providing a longer useful lifetime of the heating elements 70.

Figure 11:
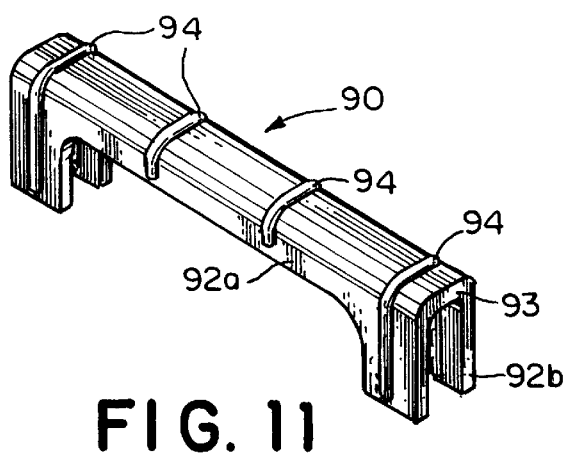
FIG. 11 is a top, left perspective view of a heating element insulator.
Figure 13:
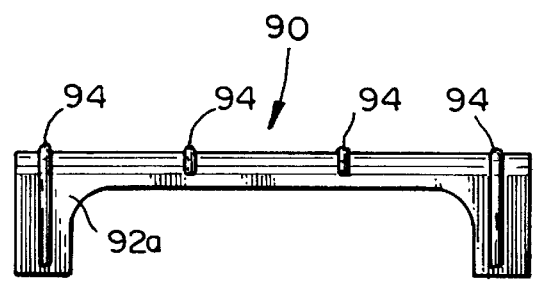
FIG. 13 is a side view of the heating element insulator depicted in FIG. 11.
Figure 12:
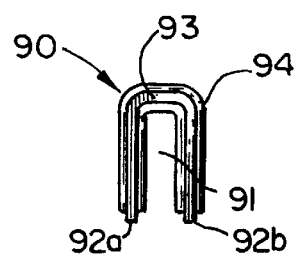
FIG. 12 is an end view of the heating element insulator depicted in FIG. 11.

The heating elements 70 are electrically insulated from the platen plates, 63 and 64, by a plurality of heating element insulators 90. The heating element insulators 90 are shown in greater detail in FIGS. 11–13. Each heating element insulator 90 is generally U-shaped as viewed from an end thereof and has a longitudinal channel 91 which is dimensioned to fit over the edge of a heating element 70. Insulator 90 includes a pair of side walls, 92a and 92b, in spaced parallel relation to each other and a connecting wall 93 interconnecting the side walls 92a and 92b so as to form the generally U-shaped body and longitudinal channel 91. The side walls 92a and 92b are partially cut away to minimize the amount of surface area of the heating element 70 that is covered by the insulator 90. This maximizes the amount of heat transfer from the heating element and provides for more efficient heating of the platen during operation. Preferably, the element insulators 90 have ribs 94 found on the outer surface thereof at spaced intervals. The ribs 94 serve to limit the surface area of insulators 90 which is in contact with the plates, 63 and 64, of the platens. This arrangement decreases the likelihood of short circuiting of the heating elements 70 as the element insulators 90 become metallized by metal evaporated from the heating elements 70. The element insulators 90 are installed substantially along the entire length of the heating elements 70, and preferably, the element insulators 90 are arranged in an alternating fashion such that the open sides of the element insulators 90 alternately face toward plates 63 and 64, as illustrated in FIG. 10.

Referring again to FIG. 2, there is shown the electric power feeds for the platen heating elements. A first heating element terminal 73b for the stationary platen 61b is connected to a power source (not shown) located externally to the vessel 20 through a first power terminal 75a. A second heating element terminal 74b is connected to the power source through a second power terminal 75b. The connections between the heating element terminals 73b and 74b, and the respective power terminals, 75a and 75b, are flexible, leaf-type spring connectors or jumper elements 77. The leaf-type spring connectors 77 are sufficiently flexible to accommodate for expansion and contraction of the platen during heating and cooling cycles of the furnace. The leaf-type spring connectors 77 are preferably fabricated from layers of flat sheet molybdenum. The large cross-sectional area of the spring connectors 77 is necessary to carry the current required to power the heating elements 70. Braided wire or cable can be used provided that the wire or cable has a sufficiently large cross-sectional area. However, wire or cable with a suitable crosssectional area would be bulky and awkward to use. The leaf-type spring connectors 77 are connected to the heating element terminals, 73b and 74b, using bar clamps, studs and nuts (not shown). The leaf-type spring connectors 77 are connected to the power terminals, 75a and 75b, by jumper bars 81. Jumper bars 81 are connected to the power terminals 75a and 75b, by one or more standard sets of nuts, studs and washers. A second end of the jumper bars 81 is connected to the leaf-type spring connectors 77 in a similar manner.

Figure 14:
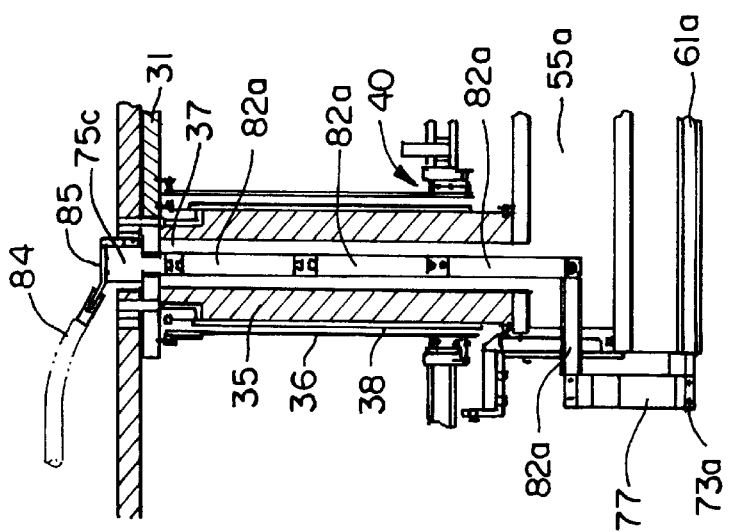
FIG. 14 is a side elevational view, in partial section, of the press depicted in FIG. 3 showing details of an electric power feedthrough.

For the moveable platen 61a, a first heating element terminal 73a is connected to a power source (not shown) located externally to the vessel 20 through a series of jumper bars 82a that pass through one of the rams 35 of the press 30, as shown in FIG. 14. In similar fashion, a second heating element terminal 74a is connected to the power source through a second series of element jumper bars 82b which pass through another one of the rams 35 of press 30. The heating element terminals 73a and 74a, and the jumper bars 82 are respectively connected by leaf-type spring connectors or jumper elements 77, which are substantially the same as those described for the stationary platen 61b. The jumper bars 82, which are connected end-to-end, pass through the center bore 37 of the ram 35. The last jumper bar is connected to a power terminal 75c which is connected to the external power source. In this manner, current is supplied to the heating elements 70 of the moveable platen 61a as the platen 61a is moved. A copper blade 85 which extends from the end of a hose or tube 84 is connected with the power terminal 75c. Water is circulated in tube 84 to remove heat from the power terminal 75c through copper blade 85.

Figure 15:
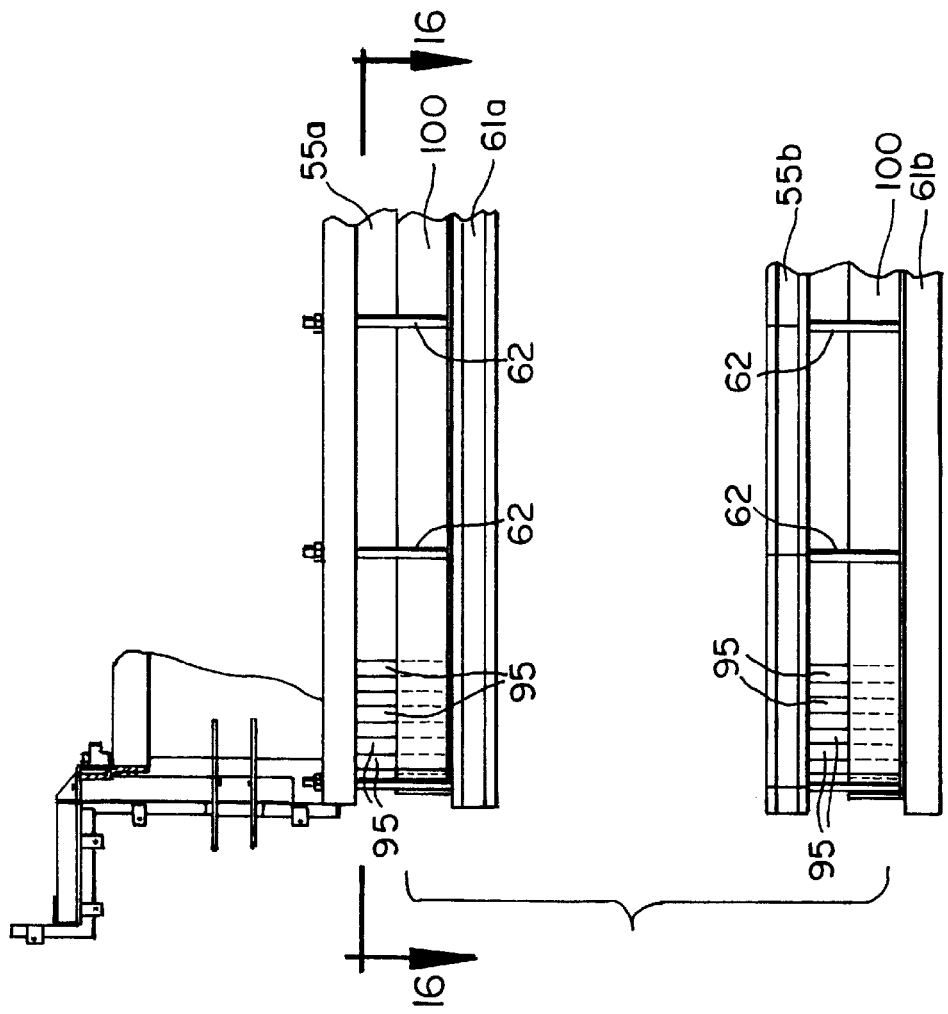
FIG. 15 is a partial side elevation view of additional details of the stationary and moveable platen and bolster assemblies used in the diffusion bonding furnace according to this invention.
Figure 16:
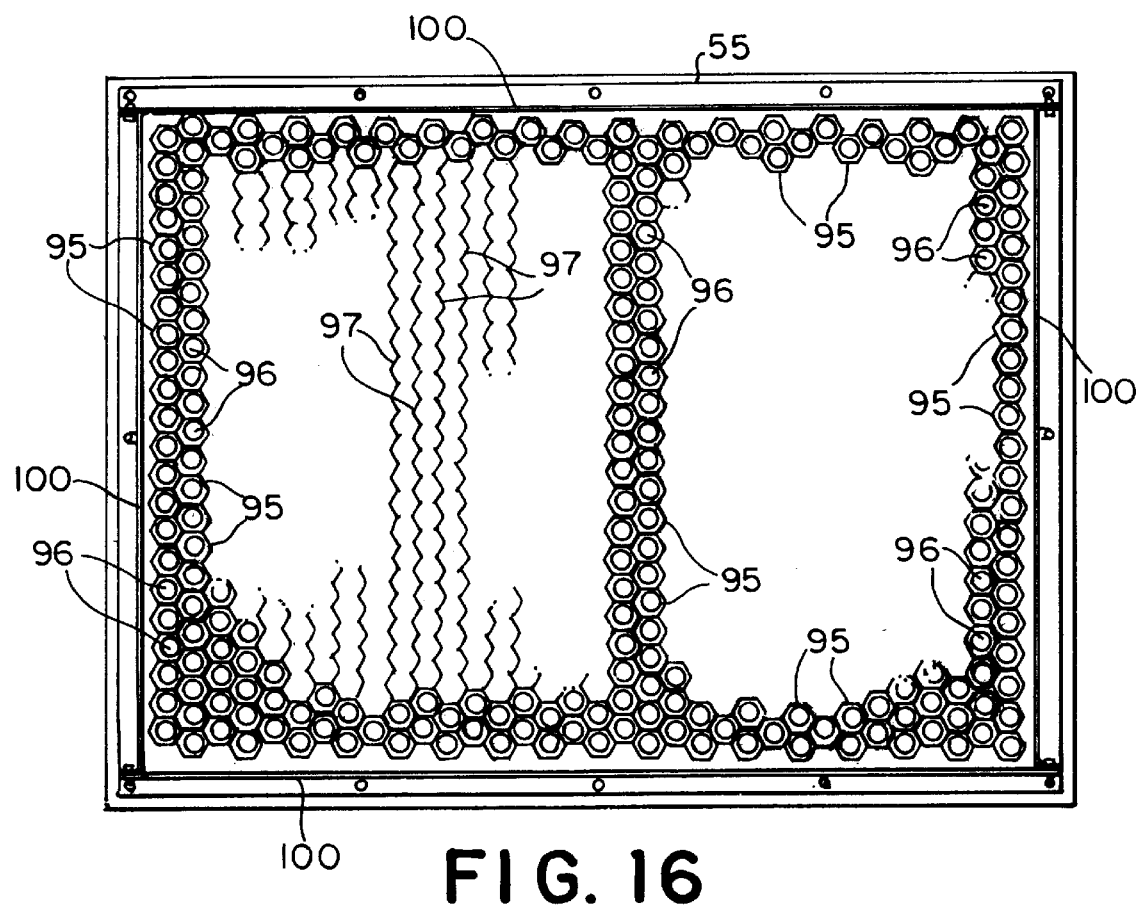
FIG. 16 is a plan view of a partial arrangement of thermal insulating elements used in a platen/bolster assembly as viewed along line 16—16 in FIG. 15.
Figure 17:
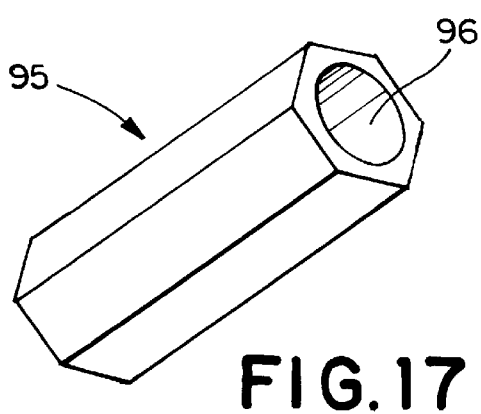
FIG. 17 is a perspective view of a thermal insulating element used in the platens shown in FIG. 15.

The moveable and stationary platens, 61a and 61b, are thermally insulated from the moveable and stationary bolsters, 55a and 55b, respectively, using a plurality of ceramic details 95 as shown in FIGS. 15–17. The ceramic details 95 comprise lengths of rod having a hexagonal cross-section. In addition, a center bore 96 can be formed therethrough to facilitate fabrication of the ceramic details 95. Preferably, an insulating packing such as a fibrous form of aluminum oxide (e.g., KAOWOOL®) is inserted into the center bores 96 of the ceramic details 95 to improve the thermal insulation of the bolster, 55*a* and 55*b*. The ceramic details 95 are arranged between platen 61*a* and bolster 55*a*, and between platen 61*b* and bolster 55*b*, so as to be in perpendicular relation to the respective platen and to the bolster. Ceramic detail holders 100, disposed around the perimeters of the bolsters, 55*a* and 55*b*, and between the bolsters, 55*a* and 55*b*, and the platens, 61*a* and 61*b*, are used to hold the ceramic details 95 in place. Studs 62 are used to space the platens, 61*a* and 61*b*, from the bolsters, 55*a* and 55*b*. Preferably, the ceramic details 95 are arranged in a honeycomb configuration, as shown in FIG. 16. Additionally, ceramic tape 97 can be placed between adjacent ceramic details 95 to reduce shock transfer between adjacent ceramic details 95. Due to the extremely high loads that are applied to the ceramic details 95 during operation of the press 30, the surfaces of the ceramic details 95 and the mating surfaces of the platens, 61*a* and 61*b*, and bolsters, 55*a* and 55*b*, must be essentially free of all dirt and ceramic dust. Further, the heights of the individual ceramic details 95 are precisely measured, preferably to the nearest tenthousandth of an inch, and recorded on each ceramic detail 95, so that the ceramic details 95 can be arranged such that the variation, if any, between two adjacent ceramic details is minimized.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A diffusion bonding furnace comprising:
   a) a pressure vessel having two side walls, a front wall, a back wall, a top, and a floor, said walls, top, and floor defining a chamber said pressure vessel being adapted for maintaining said chamber at a pressure other than atmospheric pressure;
   b) a press which penetrates through an opening in the top of the pressure vessel, said press having a first end disposed within the chamber;
   c) means for sealing the opening in the top of the pressure vessel around said press to prevent leakage when the interior of the pressure vessel is at the pressure other than atmospheric pressure;
   d) a moveable bolster secured to the first end of said press; and
   e) a moveable platen attached to said moveable bolster.

2. The diffusion bonding furnace recited in claim 1 wherein said press comprises:
   a) a drive mechanism;
   b) a ram attached to said drive mechanism and extending through the opening in the top of said pressure vessel; and
   c) a sleeve surrounding said ram and extending through the opening in the top of said pressure vessel in concentric relation to said ram, said sleeve being adapted to enable said ram to move laterally relative to said sleeve.

3. The diffusion bonding furnace recited in claim 2 wherein the sealing means comprises an O-ring disposed around the opening in the top of said pressure vessel and abutting against said sleeve.

4. The diffusion bonding furnace recited in claim 2 wherein said press comprises a jacket enclosing a substantial portion of said ram and disposed between said ram and said sleeve, said jacket being adapted to hold a quantity of a coolant for removing heat from said ram.

5. The diffusion bonding furnace recited in claim 1 comprising:
   a) a stationary bolster in said pressure vessel; and
   b) a stationary platen attached to said stationary bolster and positioned directly below the moveable platen.

6. The diffusion bonding furnace recited in claim 5 comprising a bolster support base secured to the floor of the pressure vessel for supporting said stationary bolster.

7. A diffusion bonding furnace comprising:
   a) a bolster;
   b) a platen attached to said bolster; and
   c) a plurality of ceramic details disposed between the platen and the bolster for thermally insulating the bolster from the platen.

8. The diffusion bonding furnace recited in claim 7 wherein each of said plurality of ceramic details comprises a length of ceramic rod having a hexagonal cross-section and a longitudinal bore formed therethrough.

9. The diffusion bonding furnace recited in claim 8 wherein said plurality of ceramic details are oriented perpendicularly relative to said bolster and said platen.

10. The diffusion bonding furnace recited in claim 9 wherein the plurality of ceramic details are arranged in rows to form a honeycomb-shaped configuration.

11. The diffusion bonding furnace recited in claim 10 comprising ceramic tape positioned between adjacent rows of the plurality of ceramic details.

12. The diffusion bonding furnace recited in claim 7 comprising means for retaining said plurality of ceramic details between said bolster and said platen.

13. A diffusion bonding furnace comprising:
   a) a pressure vessel having two side walls, a front wall, a back wall, a top, and a floor, said walls, top, and floor defining a chamber;
   b) a press which penetrates through an opening in the top of the pressure vessel, said press comprising:
      1) a first end disposed within the chamber;
      2) a drive mechanism;
      3) a ram attached to said drive mechanism and extending through the opening in the top of said pressure vessel; and
      4) a sleeve surrounding said ram and extending through the opening in the top of said pressure vessel in concentric relation to said ram, said sleeve being adapted to move laterally relative to said ram;
   c) means for sealing the opening in the top of the pressure vessel around said press to prevent leakage when the interior of the pressure vessel is at a pressure other than atmospheric pressure;
   d) a moveable bolster secured to said first end of said press;
   e) a moveable platen attached to said movable bolster, said movable platen comprising:
      1) a first metallic plate;
      2) a second metallic plate aligned substantially parallel to said first metallic plate;
      3) a plurality of metallic bars arranged between the first and second platen plates so as to form a plurality of channels running the length of the platen; and 4) a plurality of heating elements disposed in the channels; and f) a plurality of ceramic details disposed between the platen and the bolster for thermally insulating the bolster from the platen.

14. A platen for a diffusion bonding furnace comprising:

a) a first metallic plate;

b) a second metallic plate aligned substantially parallel to the first metallic plate;

c) a plurality of metallic bars arranged between the first and second plates so as to form a plurality of channels running the length of the platen; and d) a plurality of heating elements disposed in the channels.

15. The platen recited in claim 14 comprising a plurality of heating element insulators disposed on said plurality of heating elements for electrically insulating said plurality of heating elements from said first and second metallic plates and from said plurality of metallic bars.

16. The platen recited in claim 15 wherein each of the plurality of heating element insulators comprises:

a) a pair of side walls in spaced parallel relation to each other; and b) a connecting wall interconnecting the side walls, whereby a generally U-shaped channel is formed for receiving the heating element.

17. The platen recited in claim 16 wherein each of the plurality of heating element insulators comprises a pair of ribs disposed on an outer surface of said connecting wall.

18. The platen recited in claim 14 comprising:

a) a terminal connector operatively connected to said plurality of heating elements;

b) a power feed terminal disposed in the diffusion bonding furnace apart from the platen; and c) a flexible connector having a first end connected to said terminal connector and a second end connected to said power feed terminal.

19. The platen recited in claim 18 wherein said flexible connector comprises a plurality of laminations formed of an electrically conductive material.

20. The platen recited in claim 18 comprising:

a) a second terminal connector operatively connected to said plurality of heating elements;

b) a second power feed terminal disposed in the diffusion bonding furnace apart from the platen; and c) a second flexible connector having a first end connected to said second terminal connector and a second end connected to said second power feed terminal.

21. A diffusion bonding furnace comprising:

a) a pressure vessel having two side walls, a front wall, a back wall, a top, and a floor, said walls, top, and floor defining a chamber;

b) a press which penetrates through an opening in the top of the pressure vessel, said press having a first end disposed within the chamber, wherein said press comprises:

a) a drive mechanism;

b) a ram attached to said drive mechanism and extending through the opening in the top of said pressure vessel; and c) a sleeve surrounding said ram and extending through the opening in the top of said pressure vessel in concentric relation to said ram, said sleeve being adapted to enable said ram to move laterally relative to said sleeve;

c) means for sealing the opening in the top of the pressure vessel around said press to prevent leakage when the interior of the pressure vessel is at a pressure other than atmospheric pressure;

d) a moveable bolster secured to the first end of said press; and e) a moveable platen attached to said moveable bolster.

22. The diffusion bonding furnace recited in claim 21 wherein the sealing means comprises an O-ring disposed around the opening in the top of said pressure vessel and abutting against said sleeve.

23. The diffusion bonding furnace recited in claim 21 wherein said press comprises a jacket enclosing a substantial portion of said ram and disposed between said ram and said sleeve, said jacket being adapted to hold a quantity of a coolant for removing heat from said ram.

24. A diffusion bonding furnace comprising:

a) a pressure vessel having two side walls, a front wall, a back wall, a top, and a floor, said walls, top, and floor defining a chamber;

b) a press which penetrates through an opening in the top of the pressure vessel, said press having a first end disposed within the chamber;

c) means for sealing the opening in the top of the pressure vessel around said press to prevent leakage when the interior of the pressure vessel is at a pressure other than atmospheric pressure;

d) a moveable bolster secured to the first end of said press;

e) a moveable platen attached to said moveable bolster;

f) a stationary bolster in said pressure vessel;

g) a stationary platen attached to said stationary bolster and positioned directly below the moveable platen; and h) a bolster support base secured to the floor of the pressure vessel for supporting said stationary bolster.

25. A diffusion bonding furnace comprising:

a) a bolster;

b) a platen attached to said bolster; and c) a plurality of ceramic details disposed between the platen and the bolster for thermally insulating the bolster from the platen, wherein each of said ceramic details comprises a length of ceramic rod having a hexagonal cross-section and a longitudinal bore formed therethrough.

26. The diffusion bonding furnace recited in claim 25 wherein said plurality of ceramic details are oriented perpendicularly relative to said bolster and said platen.

27. The diffusion bonding furnace recited in claim 26 wherein the plurality of ceramic details are arranged in rows to form a honeycomb-shaped configuration.

28. The diffusion bonding furnace recited in claim 27 comprising ceramic tape positioned between adjacent rows of the plurality of ceramic details.

29. A diffusion bonding furnace comprising:

a) a bolster;

b) a platen attached to said bolster;

c) a plurality of ceramic details disposed between the platen and the bolster for thermally insulating the bolster from the platen; and d) means for retaining said plurality of ceramic details between said bolster and said platen.

* * * * *